Figure 1:
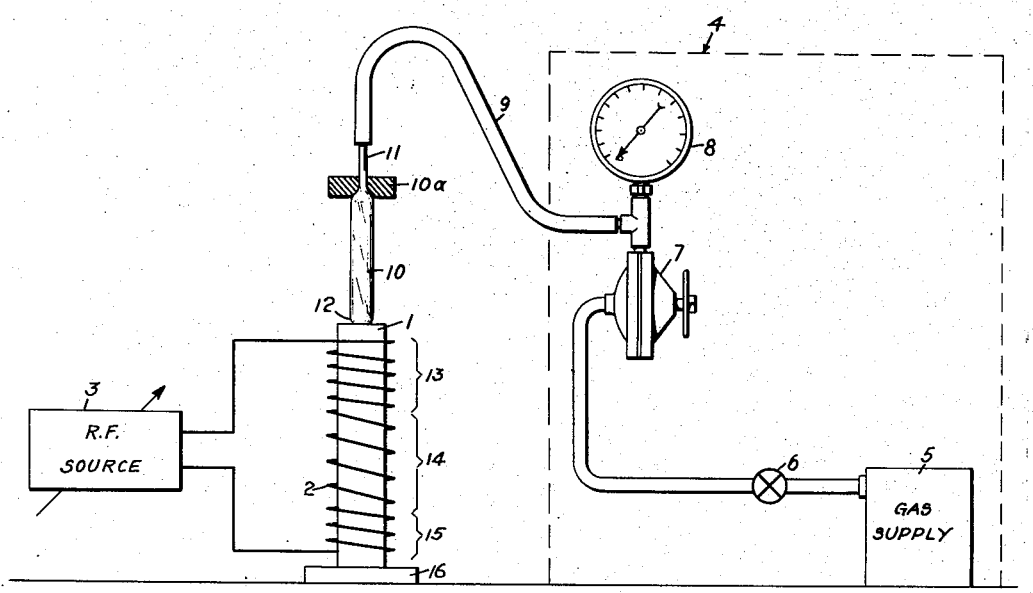

June 21, 1955  C. P. MAJKRZAK ET AL  2,711,055
METHOD OF RESHAPING TUBULAR STOCK
Filed June 25, 1952  2 Sheets-Sheet 1

INVENTORS
CHARLES P. MAJKRZAK
ERNEST R. JONES
BY
ATTORNEY

June 21, 1955 — C. P. MAJKRZAK ET AL — 2,711,055
METHOD OF RESHAPING TUBULAR STOCK Filed June 25, 1952 — 2 Sheets-Sheet 2

INVENTORS
CHARLES P. MAJKRZAK
ERNEST R. JONES
BY
ATTORNEY

United States Patent Office 2,711,055
Patented June 21, 1955

2,711,055
METHOD OF RESHAPING TUBULAR STOCK

Charles P. Majkrzak, Newark, and Ernest R. Jones, Caldwell, N. J., assignors to International Telephone and Telegraph Corporation, a corporation of Maryland Application June 25, 1952, Serial No. 295,576

4 Claims. (Cl. 49—84)

This invention relates to the art of producing glass envelopes and more particularly to a method for making glass envelopes for electronic discharge and gaseous discharge devices of various shapes and sizes from tubular stock.

Heretofore the shaping of glass vessels from tubular stock has been concerned with means in which a length of tubing is gripped at one or both ends while a portion is heated until soft and then drawn out and blown to the required shape, either in a mold or by other shaping tool. The shaping of a glass vessel from tubes may also be effected at the ends of said tubes in a similar manner. When these processes are employed, great difficulty is experienced in producing a uniform product as the thickness and diameter of the tubing always vary however carefully the tubing is selected, and any faults of this kind are greatly exaggerated in the finished product.

It will be obvious to those skilled in the art that any such fault appearing in a glass envelope of an electron discharge device subjected to a vacuum or possibly a gas pressure must obviously be avoided. Therefore, it is an object of this invention to provide a method of producing glass envelopes for electron and gaseous discharge devices of various shapes and sizes from tubular stock having a wall thickness substantially free from faults that would rupture when exposed to a vacuum or a gaseous pressure.

A feature of this invention is the employment of a split carbon mold of the desired internal configuration having a tapered opening into which tubular stock having a closed end is fed under pressure as the glass stock is heated preferably by means of an induction heating coil surrounding the mold.

Another feature of this invention is the provision by means of the induction coil to provide a plurality of heat controlled temperature zones to produce the required softness of glass needed prior to and during the blowing operation.

A further feature of this invention is the employment of a pressure regulated source of compressed air or inert gases to accomplish the blowing operations which forms the thermally softened tubular glass stock to the configuration of the selected carbon mold.

Where the term "glass" is used herein with reference to the stock and envelopes it is to be understood that other materials of characteristics similar to glass are included. Such materials, for example, include various compounds of silica, quartz, and other thermoplastic material.

The above mentioned and other features and objects of this invention will become more apparent by reference to the following description taken in conjunction with the accompanying drawings, in which:

Fig. 1 is a view in elevation of an embodiment of the apparatus necessary to mold tubular glass stock in accordance with the principles of this invention;

Figs. 2, 2a, 2b, and 2c are sectional views partially in elevation showing the progress of a piece of tubular stock entering the mold of Fig. 1 in the process of being formed into a desired configuration; and Figs. 3, 3a, 3b, and 3c are sectional views taken along lines 3—3, 3a—3a, 3b—3b, and 3c—3c of Figs. 2, 2a, 2b, and 2c, respectively.

Referring to Fig. 1, the apparatus for molding tubular stock of glass or other heat softening material into predetermined configurations for employment as envelopes for electron or gas discharge devices is illustrated. The essential elements therein includes a carbon mold 1 in the form of a split bar having an interior configuration corresponding to the desired envelope configuration, an induction heating coil 2 wound concentric of mold 1 substantially as illustrated, an R.-F. source 3 to supply controllable R. F. energy to coil 2, and a pressure regulated gas source 4. The gas employed therein may be compressed air or any suitable inert gas capable of performing the glass blowing or forming operation without combining with the heated glass.

Source 4 comprises a supply 5 of compressed air or inert gas, a shut-off valve 6, a pressure regulator 7, and a pressure gauge 8 cooperating to allow manual selection of the proper pressure, as well as, proper starting time for the injection of the gas and the length of time the gas is applied. From source 4 the gas pressure is applied through tubing 9, composed of rubber or other suitable material not appreciably affected by the induction heating of mold 1, from the pressure regulator 7 to a piece of tubular glass stock 10 having a reduced diameter tubulation 11 for coupling the tubing 9. The end 12 of stock 10 is closed to provide a means for the gas pressure to be effective in forming the softened glass to the configuration of mold 1.

Briefly the process of envelope molding from tubular stock may be started as follows. The carbon mold 1, in the shape of a slit bar, is heated by means of the induction-heating coil 2. When the mold 1 achieves the proper temperature the closed end 12 of stock 10 is applied to mold 1, preferably under a given weight pressure as indicated at 10a, together with suitable guides. As the stock 10 is heated by direct contact with mold 1 it softens and enters the restricted opening of the mold. When a desired length of stock is inserted, air or other gas of regulated pressure from source 4 is admitted into the stock by tubing 9. The temperature of the mold 1 is so controlled as to avoid "necking down" of the stock material. When the stock is fed the full length of the mold and is of a substantially even temperature throughout its length, the stock is slowly blown out to form itself against the cavity wall within mold 1. With this blowing or forming step accomplished, if natural cooling of mold 1 is permitted, a thoroughly annealed, molded envelope is obtained.

Faithful reproduction of this process is accomplished by noting several details that must be present in the apparatus employed. Referring to Fig. 1, it will be noted that the coil 2 is not uniformly wound, but is rather wound to produce three temperature or heating zones, 13, 14, and 15. The coil 2 is wound to be most concentrated in zone 13 where the highest temperature is required, for, it is in this area that the tubular stock 10 is deformed to enter the mold proper. Throughout zone 14 the coil is wound to be less concentrated to produce a lower, but constant substantially uniform temperature throughout the mold proper to assure an even softening of the stock 10. The coil 2 is again wound more concentrated in zone 15 to counteract thermal "end" losses due to radiation and conduction to the mold support 16 providing a further assurance that stock 10 will be evenly softened prior to and during the blowing operation to form the stock 10 to the configuration of the mold cavity.

Figure 2C:
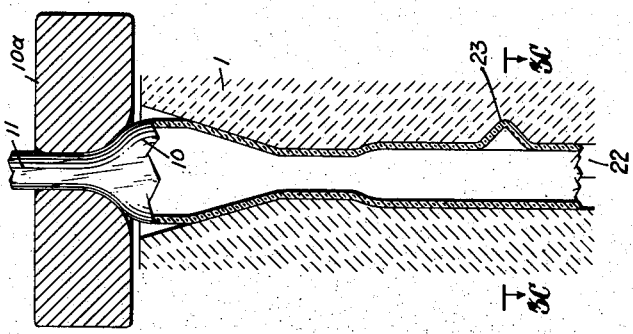
Figure 2B:
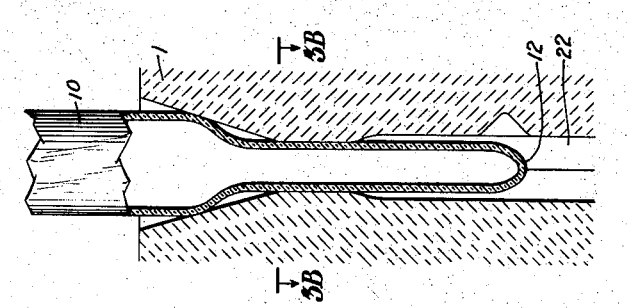
Figure 2A:
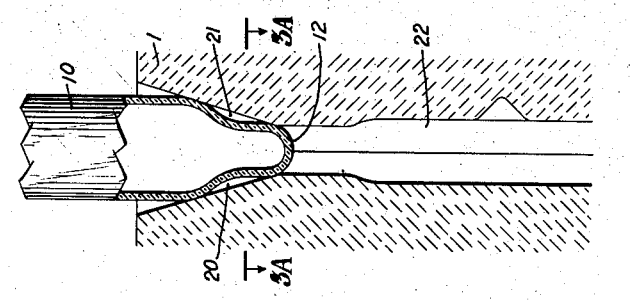
Figure 2:
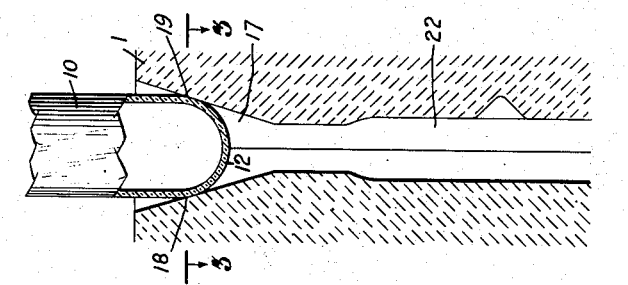
Figure 5C:
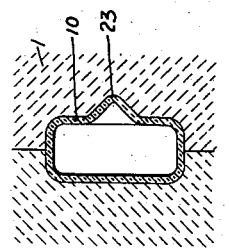
Figure 5B:
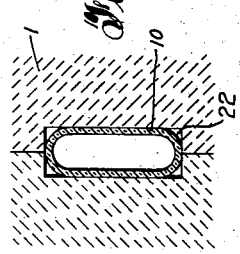
Figure 5A:
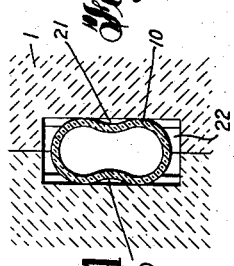
Figure 5:
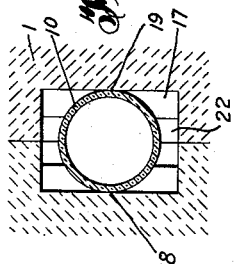

Other important details may be readily understood by referring to the various stages of the molding process shown in Figs. 2, 2a, 2b, and 2c and the corresponding cross-sections shown in Figs. 3, 3a, 3b, and 3c. As the glass stock 10 enters mold 1, it immediately establishes point contact with the tapered deforming chamber 17 of mold 1 at points 18 and 19, as shown in Fig. 2. The cross-section of stock 10 is circular as shown in Fig. 3. Although the immersed stock 10 is heated by radiation of heat from mold 1, it is more severely heated at points 18 and 19 by conduction of heat from the mold. As a result, points 18 and 19 are the first to soften and to be deflected by the walls of the deforming chamber 17.

A further manual or preferably a pressure feeding of the stock by the weight of the stock 10 and weight 10a into mold 1 causes a continuity of softened spots 18 and 19, giving softness to opposite sides 20 and 21 of stock 10. Being easiest to deform, these opposite sides 20 and 21 are pushed towards one another by the deflecting action of the remaining harder portions of stock 10, as may be observed in Figs. 2a and 3a. Too rapid feeding of stock 10 into mold 1 causes sides 20 and 21 to contact one another and stock 10 is destroyed by their adhesion. A careful, slow feeding rate which may be determined by applying a weight 10a to the stock will permit the normally cooler portions of stock 10 to also soften by radiated heat from mold 1, permitting normal entry into the mold cavity 22, as shown in Fig. 2b, producing the uniform cross-section illustrated in Fig. 3b.

An increase in temperature, achieved by increasing the energy from source 3, to further soften that portion of stock 10 within mold cavity 22 and the internal applications of gaseous pressure from source 4 produces the desired molded conditions as shown in Figs. 2c and 3c.

Performing tests with a model of an embodiment of the invention the following working conditions were found to produce the satisfactory results in the production of glass envelopes for electron discharge devices in accordance with the object and principle of this invention.

| Initial Temperature, ° C. | | Forming Temperature, ° C. | |
| --- | --- | --- | --- |
| Zone 13 | 850 | Zone 13 | |
| Zone 14 | 700 | Zone 14 | 850 |
| Zone 15 | 700 | Zone 15 | 850 |
| Initial Gas Pressure, p. s. i. | | Forming Pressure, p. s. i. | |
| 0 | | 1 to 3 | |

The temperature of zone 13 must be higher initially to start softening stock 10, as hereinabove mentioned, with the remaining zones hot enough to maintain stock 10 in a plastic but shape retaining state. When the temperature is raised in the forming or blowing operation zones 14 and 15 must be raised as indicated hereinabove to provide a more plastic material which may be more easily formed to the configuration of cavity 22. While this increasing of the temperature of the cavity portion is desired to speed up the forming operations it will be understood that such temperature increase is not essential where the stock material is thin or speed of forming need not be rapid.

The working temperatures hereabove cited are given by way of example only for one model of an embodiment of this invention and one type of glass. These temperature conditions will of course change depending upon the softening point of the stock material employed, the thickness of the walls of said stock, the diameter of said stock, the thickness of the walls of the mold employed, and the dimensions and shape to which the stock is to be formed. Thus, practicing the art of envelope forming in accordance with this invention the working temperatures must be adjusted with these considerations in mind.

The apparatus and method hereinabove described has been employed in the production of gas discharge devices and traveling wave discharge devices, among others. Steps for processing the envelope prior to and following the molding operation are as follows. Tubular stock 10 whose perimeter is approximately 80% that of the perimeter of the finished product is cut to length, closed at one end 12, and tubulated on the other end 11, to receive the gas-pressure tubing. After the forming process each molded projection, similar to projection 23 of Figs. 2c and 3c, is blown open and sealed about leads to electrodes disposed within the envelope. After tipping off to size, the complete assembly is subjected to heat treatment for thorough annealing.

The internal cross-section of the carbon mold may have any desired configuration that is practical to obtain. The cross-section of the mold shown in Figs. 3 to 3d is rectangular in shape with tubulations or projections contained at desired points allowing for insertion of internal construction of an electron discharge device. Other cross-sections of molds may be, for example, circular, elliptical, polyhedral, triangular, ribbed polyhedrals, and fluted.

While we have described above the principle of our invention in connection with specific method steps it is to be clearly understood that this description is made only by way of example and not as a limitation to the scope of our invention, as set forth in the objects thereof and in the accompanying claims.

We claim:

1. A method of molding tubular stock into a shape corresponding to the inner configuration of a mold having an entrance portion of a cross-sectional shape having at least one dimension less than a corresponding dimension of said stock, comprising heating said entrance portion to a temperature sufficient to soften said stock, applying said stock to said entrance portion in contact therewith to soften said stock, feeding said stock as it softens to form the stock to substantially the cross-sectional shape of said entrance portion for introduction into the cavity of said mold, heating the cavity portion of the mold to maintain the stock therein at a given shape retaining softness and when a desired amount of stock has been fed into said cavity subjecting said softened stock therein to an internal pressure to expand the stock to the shape of said cavity.

2. A method according to claim 1, wherein the heating of said entrance portion is controlled to being the entrance portion to a first temperature sufficient to soften said stock upon contact therewith and the heating of the cavity is controlled to bring the cavity portion to a second temperature less than said first temperature but sufficient to maintain said stock within said cavity in a softened but shape retaining state.

3. A method according to claim 1, further including the step of applying additional heat to the cavity portion to increase the temperature of said stock beyond said given shape retaining softness for the stock expansion step.

4. A method according to claim 3, wherein the application of additional heat to said mold for the stock expansion step is controlled to equal substantially the initial heating temperature of said entrance portion.

References Cited in the file of this patent

UNITED STATES PATENTS

| 406,692 | Atterbury | July 9, 1889 |
| 1,859,011 | Wales | May 17, 1932 |
| 2,151,874 | Simons | Mar. 28, 1939 |
| 2,345,670 | Heath | Apr. 4, 1944 |
| 2,419,864 | Westin | Apr. 29, 1947 |
| 2,452,197 | Kennedy | Oct. 26, 1948 |
| 2,597,237 | Friend | May 20, 1952 |

FOREIGN PATENTS

| 495,376 | Great Britain | Nov. 7, 1938 |